United States Patent
Schenk et al.

(10) Patent No.: US 6,815,898 B2
(45) Date of Patent: Nov. 9, 2004

(54) DEVICE FOR TRIGGERING A LIGHTING DEVICE IN A MOTOR VEHICLE

(75) Inventors: Joachim Schenk, Meinersen-Ohof (DE); Michael Schumpelt, Schwieberdingen (DE); Juergen Hirt, Pforzheim (DE); Primo Scarlata, Gerlingen (AU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/257,197

(22) PCT Filed: Jan. 23, 2002

(86) PCT No.: PCT/DE02/00204
§ 371 (c)(1),
(2), (4) Date: Feb. 6, 2003

(87) PCT Pub. No.: WO02/065818
PCT Pub. Date: Aug. 22, 2002

(65) Prior Publication Data
US 2003/0168990 A1 Sep. 11, 2003

(30) Foreign Application Priority Data
Feb. 9, 2001 (DE) .......................................... 101 05 903

(51) Int. Cl.[7] ................................................. B60Q 1/02
(52) U.S. Cl. ....................................... 315/82; 307/10.8
(58) Field of Search ............................ 315/77, 82, 246, 315/362; 307/10.1, 10.8, 116, 118, 120; 340/936

(56) References Cited

U.S. PATENT DOCUMENTS

| | | | | |
|---|---|---|---|---|
| 4,686,423 A | * | 8/1987 | Eydt ............................ | 315/82 |
| 4,841,198 A | * | 6/1989 | Wilhelm ....................... | 315/82 |
| 5,594,323 A | | 1/1997 | Bichler et al. ............... | 323/222 |
| 5,621,277 A | * | 4/1997 | Ricca ........................... | 315/86 |
| 5,859,506 A | | 1/1999 | Lemke ........................ | 315/308 |
| 5,942,853 A | | 8/1999 | Piscart ......................... | 315/82 |
| 6,351,074 B1 | * | 2/2002 | Ito et al. ...................... | 315/82 |
| 6,483,246 B2 | * | 11/2002 | Sugimoto et al. ............. | 315/82 |

FOREIGN PATENT DOCUMENTS

| EP | 0 935 404 | 8/1999 |
|---|---|---|
| FR | 2 707 021 | 12/1994 |

\* cited by examiner

*Primary Examiner*—Thuy Vinh Tran
(74) *Attorney, Agent, or Firm*—Kenyon & Kenyon

(57) ABSTRACT

A device for triggering a lighting device of a motor vehicle includes a control arrangement which generates at least one pulse width modulated control signal for at least one switching arrangement via which at least one lighting device may be supplied with electric power. The control arrangement receives a measure of the power supply voltage supplied at least to the lighting device in order to influence the control signal as a function of the power supply voltage. The control arrangement determines the control signal as a function of at least one additional operating parameter, in addition to the power supply voltage, of the motor vehicle.

10 Claims, 1 Drawing Sheet

DEVICE FOR TRIGGERING A LIGHTING DEVICE IN A MOTOR VEHICLE

FIELD OF THE INVENTION

The present invention relates to a device for triggering a lighting device in a motor vehicle.

BACKGROUND INFORMATION

European Patent Application No. 0 935 404 describes a circuit for stabilizing the voltage for a lamp, i.e., for headlights on a motor vehicle. The lamp voltage is stabilized at a reduced power loss by the fact that an additional time-delay switch controllable by a trigger circuit is included in the lamp circuit; when the power supply voltage is lower than the predefined nominal operating voltage of the lamp, the trigger circuit keeps the time-delay switch switched on continuously; and at a higher power supply voltage than the nominal operating voltage of the lamp, the trigger circuit periodically switches the time-delay switch on and off, the ratio of the on time to the duration of the period corresponding to the square of the ratio of the nominal operating voltage to the applied power supply voltage.

It is an object of the present invention to further stabilize the lighting intensity of a lighting device arranged in a motor vehicle, even for different operating states of the vehicle.

SUMMARY OF THE INVENTION

The device according to the present invention for triggering a lighting device of a motor vehicle includes a control arrangement which generates at least one pulse width modulated control signal for at least one switching arrangement via which at least one lighting device may be supplied with electric power. The control arrangement receives a measure of the power supply voltage which supplies power at least to the lighting device for influencing the control signal as a function of the power supply voltage. The control arrangement determines the control signal as a function of at least one additional operating parameter of the vehicle in addition to the power supply voltage. Due to the variable adaptation of the pulse width modulated control signal, different operating situations of the motor vehicle may be taken into account in which, as experience has shown, light intensities which fluctuate to different extents may occur. The driving speed is available as one possible operating parameter. The battery is usually under the greatest load when the vehicle is standing still, so that stabilization has priority. However, the brightness of the headlights need not be maximized when the vehicle is stationary. Driving speed as a possible operating parameter is taken into account in determining the control signal. Furthermore, flickering of the lights caused by other electric loads being turned on or off is hardly noticeable while driving. Thus, at high speeds, the stabilization function is not so strongly emphasized as adequate brightness of the lamp, i.e., the headlights.

In an example embodiment, the control arrangement specifies a maximum pulse width as a control signal when the power supply voltage drops below a lower limit. The lower limit is variable according to the present invention as a function of at least one operating parameter of the vehicle. The calculation procedure for determining the pulse width is stored in the control arrangement as a function of the lower limit value. Only this one value need be varied as a function of the operating parameter in order to take into account the prevailing operating situation of the vehicle in setting the control signal. The corresponding algorithm thus has a relatively simply structure.

In an example embodiment, the control signal may depend on the charge state of the automotive battery. The charge state is determined, for example, in conjunction with the power supply voltage before starting the vehicle and is used for setting the new lower limit value, for example. In the case of a high power supply voltage, indicating a fully charged automotive battery, the lower limit value may be set higher, because stabilization then plays a subordinate role. When the battery is relatively low, however, the tendency of the lighting device to flicker is much greater. Therefore, fluctuations in power supply voltage in a larger stabilization range are taken into account in setting the control signal.

In an example embodiment, the control arrangement specifies a minimum pulse width as the control signal when the power supply voltage exceeds an upper limit value. The minimum pulse width is variable as a function of the operating parameter. Due to this definition of the minimum pulse width, the stabilization range of the control arrangement may also be adapted to the prevailing operating situation. With an increase in driving speed, the minimum pulse width is increased for adaptation of the stabilization range. In addition, this provides overvoltage protection and lengthens the lifetime of the battery.

An example embodiment of the device according to the present invention is illustrated in the drawings and is described below.

DETAILED DESCRIPTION

Figure 1:
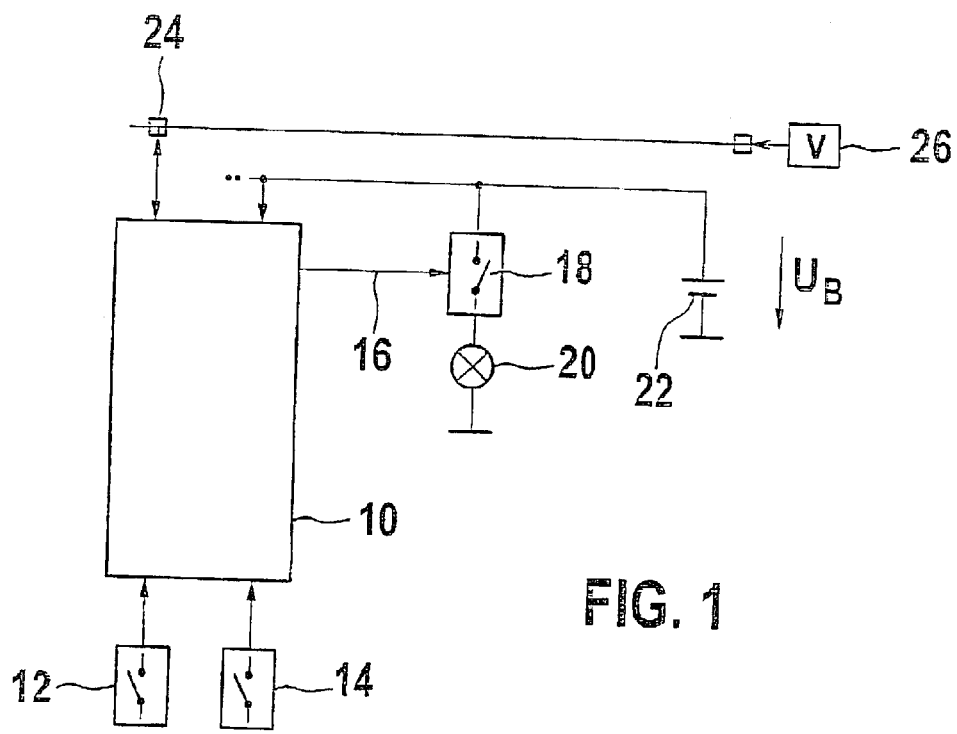
FIG. 1 shows a block diagram.

An output signal of a first operating element 12 and an output signal of a second operating element 14 are sent to a microcontroller 10. Microcontroller 10 generates a trigger signal 16 according to a certain computation algorithm, this signal then triggering a switching arrangement 18, opening or closing it. A lamp 20 is supplied with power supply voltage UB provided by a battery 22 via switching arrangement 18. Power supply voltage UB is also sent to microcontroller 10, which also exchanges data over a bus system 24, over which driving speed v detected by a speed sensor 26 is sent to microcontroller 10.

Figure 2:
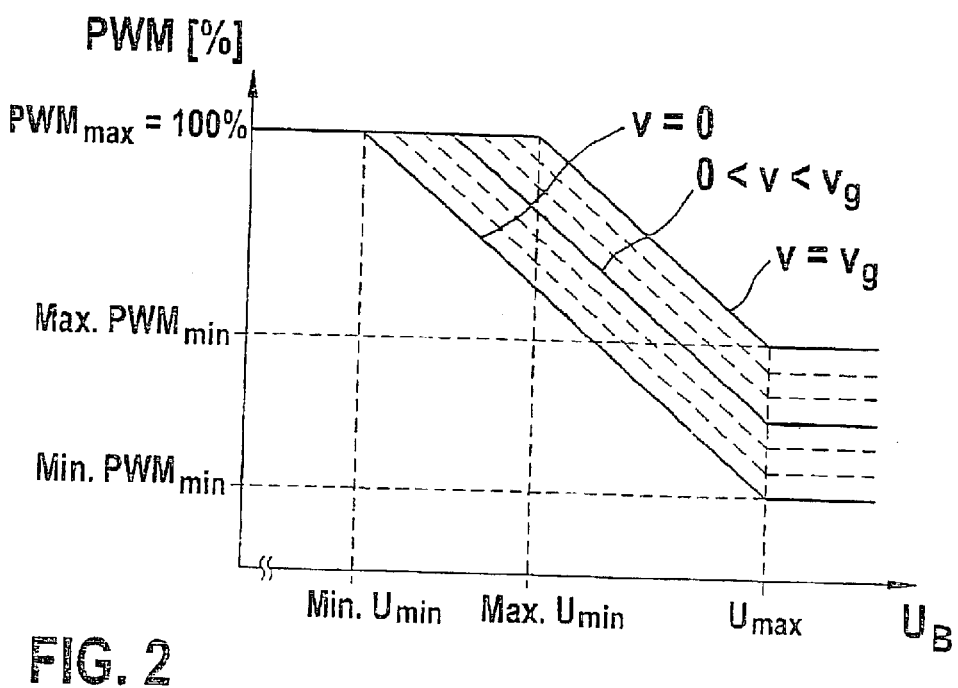
FIG. 2 shows the triggering for a lighting device as a function of operating parameters.

Trigger signal 16 is a pulse width modulated signal which varies between a maximum pulse width $PWM_{max}$ of 100% and a minimum min $PWM_{min}$ of minimum pulse width $PWM_{min}$. FIG. 2 shows a linear relationship between pulse width PWM and power supply voltage UB. Three characteristic curves are shown as a function of driving speed v as an example. Lower limit value $U_{min}$ decreases from max $U_{min}$ to min $U_{min}$ with a decrease in driving speed. When power supply voltage UB reaches or falls below lower limit value $U_{min}$, microcontroller 10 generates a control signal 16 having a maximum pulse width $PWM_{max}$ of 100%, for example, i.e., switching arrangement 18 assumes a continuous on state. In the range between lower limit value $U_{min}$ and upper limit value $U_{max}$, pulse width PWM decreases linearly with an increase in operating voltage. If operating voltage UB reaches or exceeds upper limit value $U_{max}$, pulse width PWM remains constantly at the level of minimum pulse width $PWM_{min}$. Upper limit value $U_{max}$ retains its value independently of a change in driving speed v. However, minimum pulse width $PWM_{min}$ increases with an increase in driving speed v. It thus fluctuates between minimum min $PWM_{min}$ of minimum pulse width $PWM_{min}$ and maximum max $PWM_{min}$ of minimum pulse width $PWM_{min}$. With an increase in driving speed v, there is a decrease in the linear, directly proportional range within which the varying operating voltage UB is stabilized by adjusting pulse width PWM of control signal 16 as a function of operating voltage UB.

Microcontroller 10 generates pulse width modulated trigger signal 16 with which switching arrangement 18 is switched on or off. Pulse width is understood to refer to the duration of the on time based on a fixed cycle time. The brightness of lamp 20 may vary due to variations in pulse width PWM. Microcontroller 10 should then ensure that a uniform light intensity is always achieved, even when there is a fluctuation in power supply voltage UB. Flickering of lamp 20 is prevented, i.e., when there are great load changes which may directly affect power supply voltage UB. To this end, microcontroller 10 detectors power supply voltage UB and determines the instantaneous pulse width according to the following algorithm:

$$PWM=(((U_{max}-UB)[\div](U_{max}-U_{min}))\cdot(PWM_{max}-PWM_{min}))+PWM_{min}$$

where
$U_{max}$=upper limit value
UB=power supply voltage
$[U_{min}]$=lower limit value
$[PWM_{max}]$=maximum pulse width
$[PWM_{min}]$=minimum pulse width This yields the linear relationship for the average operating voltage range ($U_{min}<UB<U_{max}$) as illustrated in FIG. 2. If the absolute value of power supply voltage UB detected is below lower limit value $U_{min}$, then switching arrangement 18 is triggered by trigger signal 16 having maximum pulse width $PWM_{max}$. This may amount to 100%, for example, so that in this case switching arrangement 18 would be closed continuously. Maximum possible power supply voltage UB is thus available to lamp 20 to an unlimited extent. Lamp 20 is thus triggered at the maximum possible power and therefore at the maximum possible intensity, i.e., in cases of heavy load ($UB<U_{min}$).

If power supply voltage UB is between lower limit value $U_{min}$ and upper limit value $U_{max}$ ($U_{min}<U_{max}$), then pulse width PWM is directly proportional to UB. When power supply voltage UB reaches upper limit value $U_{max}$ ($UB \geq U_{max}$), lamp 20 is triggered at a maximum pulse width $PWM_{min}$ to ensure adequate lighting in any case.

FIG. 2 shows as an example a linear relationship between power supply voltage UB and pulse width PWM. However, to keep the light intensity constant as a function of the power supply voltage, a parabolic or other mathematical relationship between pulse width PWM and power supply voltage UB could also be used. The characteristic curve according to FIG. 2 is adapted to the type of lighting device accordingly.

In agreement with FIG. 2, the characteristic line is now shifted as a function of the operating parameter to adapt the stabilization of the light intensity to different operating states. In the example embodiment according to FIG. 2, driving speed v is used as the operating parameter. This speed is detected by a speed sensor 26 and is conveyed to microcontroller 10 via bus system 24, for example. Lower limit value $U_{min}$ varies between a minimum lower limit value min $U_{min}$ and a maximum lower limit value max $U_{min}$ as a function of the driving speed. With an increase in driving speed v, the absolute value of lower limit value $U_{min}$ increases. The characteristic curves illustrated in FIG. 2 ensure that a great measure of stabilization is achieved when the vehicle is at a standstill (v=0). Therefore, the stabilization function intervenes earlier in the form of the linear characteristic curve (in the range of $U_{min}<UB<U_{max}$) than when the vehicle is moving. If the vehicle is moving (v>0), then the maximum brightness of lamp 20 is of interest for the user. Therefore, pulse width PWM remains at maximum value $PWM_{max}$ for a greater operating voltage range than at low driving speeds. The stabilization effect is thus reduced with an increase in speed in favor of maximum brightness.

With an increase in driving speed v, minimum pulse width $PWM_{min}$ is increased while upper limit value $U_{max}$ remains constant.

The speed dependence of lower limit value $U_{min}$ and/or minimum pulse width $PWM_{min}$ is stored in microprocessor 10 in the form of tables or as a direct mathematical relationship. For calculation of instantaneous pulse width PWM, lower limit value $U_{min}$, adapted according to driving speed v, and minimum pulse width $PWM_{min}$ are used as the basis for the computation algorithm.

In another example embodiment (not shown here), upper limit value $U_{max}$ is configured to be dependent on the operating parameter and to decrease in absolute value with an increase in driving speed v.

In another example embodiment, the charge state of battery 22 is used as an operating parameter. Before starting the vehicle, microcontroller 10 detects power supply voltage UB as a measure of the charge state of battery 22. The degree of stabilization may be increased at a lower charge state of battery 22 by increasing the operating voltage range by defining the pulse width as a function of operating voltage ($U_{min}<UB<U_{max}$). The situation of a low charge state of battery 22 thus corresponds to that of low driving speeds v. In agreement with FIG. 2, there is similarly an adaptation of lower limit value $U_{min}$ and minimum pulse width $PWM_{min}$.

In addition, the output signals of operating elements 12, 14 are sent to the microcontroller. Lamp 20 is activated or deactivated as a function of these signals, with pulse width PWM thus determined.

Lamp 20 may be the headlight of a motor vehicle or the interior lighting. However, the present invention is not limited to these cases.

What is claimed is:

1. A device for triggering a lighting device of a motor vehicle, comprising:
   at least one switching arrangement via which the lighting device is supplied with electric power; and
   a control arrangement that generates at least one pulse width modulated control signal for the at least one switching arrangement, wherein:
      the control arrangement receives a measure of a power supply voltage supplying the lighting device to influence the at least one pulse width modulated control signal as a function of the power supply voltage,
      the control arrangement determines the at least one pulse width modulated control signal as a function of at least one additional operating parameter, in addition to the power supply voltage, of the motor vehicle, and
      the at least one additional operating parameter includes a signal indicating whether the motor vehicle is one of moving and at a standstill.

2. The device according to claim 1, wherein:
   the control arrangement specifies a maximum pulse width as the at least one pulse width modulated control signal when the power supply voltage drops below a lower limit value.

3. The device according to claim 2, wherein:
the lower limit value is variable as a function of the at least one additional operating parameter.

4. The device according to claim 2, wherein:
the lower limit value increases with an increase in a charge state of a battery of the motor vehicle.

5. The device according to claim 1, wherein:
the control arrangement specifies a minimum pulse width as the at least one pulse width modulated control signal when the power supply voltage exceeds an upper limit value.

6. The device according to claim 5, wherein:
the minimum pulse width is variable as a function of the at least one additional operating parameter.

7. The device according to claim 1, wherein:
the at least one additional operating parameter includes at least one of a driving speed and a charge state of a battery of the motor vehicle.

8. The device according to claim 1, wherein:
the power supply voltage is used as a measure of a charge state of a battery of the motor vehicle.

9. The device according to claim 1, wherein:
at least one signal of an operating element is sent to the control arrangement, and
the at least one pulse width modulated control signal is generated as a function of the at least one signal of the operating element.

10. A device for triggering a lighting device of a motor vehicle, comprising:
at least one switching arrangement via which the lighting device is supplied with electric power; and
a control arrangement that generates at least one pulse width modulated control signal for the at least one switching arrangement, wherein:
the control arrangement receives a measure of a power supply voltage supplying the lighting device to influence the at least one pulse width modulated control signal as a function of the power supply voltage,
the control arrangement determines the at least one pulse width modulated control signal as a function of at least one additional operating parameter, in addition to the power supply voltage, of the motor vehicle,
the control arrangement specifies a maximum pulse width as the at least one pulse width modulated control signal when the power supply voltage drops below a lower limit value; and
the lower limit value increases with an increase in a driving speed.

* * * * *